US011145957B2

(12) United States Patent
Zhao et al.

(10) Patent No.: US 11,145,957 B2
(45) Date of Patent: Oct. 12, 2021

(54) ANTENNA, ANTENNA CONTROL METHOD, AND TERMINAL

(71) Applicant: Huawei Technologies Co., Ltd., Shenzhen (CN)

(72) Inventors: Chongfeng Zhao, Xi'an (CN); Bao Lu, Shenzhen (CN); Kun Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 16/765,743

(22) PCT Filed: Nov. 21, 2017

(86) PCT No.: PCT/CN2017/112108
§ 371 (c)(1),
(2) Date: May 20, 2020

(87) PCT Pub. No.: WO2019/100202
PCT Pub. Date: May 31, 2019

(65) Prior Publication Data
US 2020/0313281 A1 Oct. 1, 2020

(51) Int. Cl.
*H01Q 1/24* (2006.01)
*H01Q 1/48* (2006.01)
*H04M 1/02* (2006.01)

(52) U.S. Cl.
CPC .............. *H01Q 1/243* (2013.01); *H01Q 1/48* (2013.01); *H04M 1/0202* (2013.01)

(58) Field of Classification Search
CPC combination set(s) only.
See application file for complete search history.

(56) References Cited

U.S. PATENT DOCUMENTS 8,674,889 B2   3/2014   Bengtsson et al.
8,923,914 B2   12/2014   Kim et al.
(Continued)

FOREIGN PATENT DOCUMENTS

CN   103579757 A   2/2014
CN   103633451 A   3/2014
(Continued)

OTHER PUBLICATIONS

Wang Chen, "Research on Novel Multiband and Compact Antenna Based on Composite Right/Left-Handed Transmission Lines Structures," South China University of Technology, 125 pages.
(Continued)

*Primary Examiner* — Junpeng Chen
(74) *Attorney, Agent, or Firm* — Conley Rose, P.C.

(57) ABSTRACT

An antenna, an antenna control method, and a terminal, where the antenna includes an antenna body and an antenna branch, where one end of the antenna branch is coupled to the antenna body, the other end is coupled to a feedpoint of a primary radio frequency channel, and the end of the antenna branch that is coupled to the feedpoint of the primary radio frequency channel is further coupled to the antenna body through a first adjustable device, where the first adjustable device is in an on state or an off state. An antenna branch is coupled between the feedpoint of the primary radio frequency channel and the antenna body, and the antenna branch is capable of coupling or decoupling by switching on or off the first adjustable device.

20 Claims, 9 Drawing Sheets

(56) References Cited

U.S. PATENT DOCUMENTS

| | | | |
|---|---|---|---|
| 9,608,331 B1 | 3/2017 | Rowson et al. | |
| 9,685,703 B2 | 6/2017 | Kao et al. | |
| 10,855,320 B2* | 12/2020 | Filipovic | H04B 1/18 |
| 2008/0111748 A1* | 5/2008 | Dunn | H01Q 1/243 |
| | | | 343/702 |
| 2012/0139813 A1 | 6/2012 | Anguera et al. | |
| 2014/0055317 A1 | 2/2014 | Xue | |
| 2014/0375514 A1* | 12/2014 | Bakalski | H01Q 9/0421 |
| | | | 343/745 |
| 2015/0372384 A1 | 12/2015 | Liu et al. | |
| 2016/0126619 A1* | 5/2016 | Tenbroek | H03H 7/40 |
| | | | 343/745 |
| 2017/0005393 A1 | 1/2017 | Wu | |
| 2017/0346178 A1* | 11/2017 | Shi | H04B 17/12 |
| 2017/0373388 A1 | 12/2017 | Wang et al. | |
| 2018/0167120 A1 | 6/2018 | Zhang et al. | |
| 2019/0081394 A1* | 3/2019 | Edwards | H04M 1/02 |
| 2019/0131722 A1 | 5/2019 | Ryu et al. | |

FOREIGN PATENT DOCUMENTS

| | | |
|---|---|---|
| CN | 104934686 A | 9/2015 |
| CN | 204732533 U | 10/2015 |
| CN | 105655690 A | 6/2016 |
| CN | 105826652 A | 8/2016 |
| CN | 105826685 A | 8/2016 |
| CN | 106602220 A | 4/2017 |
| CN | 106790795 A | 5/2017 |
| CN | 106850881 A | 6/2017 |
| EP | 2424125 A1 | 2/2012 |
| EP | 2704254 A1 | 3/2014 |
| EP | 3107150 A1 | 12/2016 |
| EP | 3229314 A1 | 10/2017 |
| JP | 2014045484 A | 3/2014 |
| JP | 2017522759 A | 8/2017 |
| WO | 2016106779 A1 | 7/2016 |
| WO | 2017183801 A1 | 10/2017 |

OTHER PUBLICATIONS

Avinash R. Vaidya, et al.,"Right-Hand/Left-Hand Circularly Polarized High-Gain Antennas Using Partially Reflective Surfaces," IEEE Antennas and Wireless Propagation Letters, vol. 13, 2014, 2014, 4 pages.

* cited by examiner

ANTENNA, ANTENNA CONTROL METHOD, AND TERMINAL

CROSS-REFERENCE TO RELATED APPLICATIONS

This application is a U.S. National Stage of International Patent Application No. PCT/CN2017/112108 filed on Nov. 21, 2017, which is hereby incorporated by reference in its entirety.

TECHNICAL FIELD

This application relates to the field of antenna technologies, and in particular, to an antenna, an antenna control method, and a terminal.

BACKGROUND

At present, communication quality of a terminal is dependent on performance of a terminal antenna in a head and hand phantom status.

Most terminal antennas have their low-frequency current nulls close to edges of the terminals. As a result, an antenna has imbalanced performance in low-frequency beside-head-and-hand-left and beside-head-and-hand-right statuses, affecting communication of the terminals in the head and hand phantom status.

SUMMARY

This application provides an antenna, an antenna control method, and a terminal to resolve a problem that communication of a terminal in a head and hand phantom status is affected by imbalanced performance of an antenna in low-frequency beside-head-and-hand-left and beside-head-and-hand-right when the terminal antenna has its low-frequency current null close to an edge of the terminal.

To achieve the foregoing objective, the following solutions are provided.

A first aspect of this application provides an antenna, including an antenna body and an antenna branch, where one end of the antenna branch is connected to the antenna body, the other end is connected to a feedpoint of a primary radio frequency channel, and the end of the antenna branch that is connected to the feedpoint of the primary radio frequency channel is further connected to the antenna body through a first adjustable device, where the first adjustable device is in an on state or an off state.

It can be learned from the foregoing solution that an antenna branch is connected between the feedpoint of the primary radio frequency channel and the antenna body, and the antenna branch can be connected or disconnected by switching on or off the first adjustable device, thereby ensuring good performance of the terminal in the beside-head-and-hand-left and beside-head-and-hand-right statuses.

In an implementation, the first adjustable device is further grounded by using a component. Grounding the first adjustable device by using a component can implement switching to low-frequency impedance, to obtain good radiation performance.

In an implementation, the antenna branch is further grounded by using a second adjustable device, where when the first adjustable device is in the off state, the second adjustable device is switched on and connected to a first inductor; and when the first adjustable device is in the on state, the second adjustable device is switched on and connected to a second inductor, where an inductance value of the second inductor is greater than an inductance value of the first inductor.

In an implementation, the second adjustable device is located at a region on the antenna branch that is far from the feedpoint of the primary radio frequency channel.

In an implementation, the antenna further includes a third adjustable device, where one end of the third adjustable device is connected to the feedpoint of the primary radio frequency channel, and the other end is grounded by using a component.

In an implementation, the antenna further includes a fourth adjustable device, where one end of the fourth adjustable device is connected to the feedpoint of the primary radio frequency channel by using a component, and the other end is connected to the antenna branch.

A second aspect of this application provides a terminal, including the antenna according to any one of the foregoing implementations.

The second aspect of this application provides an antenna control method, applied to a terminal, where the terminal includes the antenna according to any one of the foregoing implementations, and the antenna control method includes: when the terminal is in a head and hand phantom communication status, identifying a type of the head and hand phantom communication status of the terminal, where the type of the head and hand phantom communication status includes beside-head-and-hand-left and beside-head-and-hand-right; and adjusting an on/off state of a first adjustable device based on the type of the head and hand phantom communication status of the terminal.

In an implementation, the identifying a type of the head and hand phantom communication status of the terminal includes: obtaining antenna performance parameter values of the first adjustable device in the on state and the off state; and identifying the type of the head and hand phantom communication status of the terminal based on the antenna performance parameter value of the first adjustable device in the on state and the antenna performance parameter value of the first adjustable device in the off state, where when the feedpoint of the primary radio frequency channel of the terminal is on the right side of a USB interface of the terminal, if the antenna performance parameter value of the first adjustable device in the on state is greater than the antenna performance parameter value of the first adjustable device in the off state, the terminal is identified as in the beside-head-and-hand-left status; if the antenna performance parameter value of the first adjustable device in the on state is less than the antenna performance parameter value of the first adjustable device in the off state, the terminal is identified as in the beside-head-and-hand-right status; or when the feedpoint of the primary radio frequency channel of the terminal is on the left side of the USB interface of the terminal, if the antenna performance parameter value of the first adjustable device in the on state is greater than the antenna performance parameter value of the first adjustable device in the off state, the terminal is identified as in the beside-head-and-hand-right status; if the antenna performance parameter value of the first adjustable device in the on state is less than the antenna performance parameter value of the first adjustable device in the off state, the terminal is identified as in the beside-head-and-hand-left status.

In an implementation, the adjusting an on/off state of a first adjustable device based on the type of the head and hand phantom communication status of the terminal includes:

when the feedpoint of the primary radio frequency channel of the terminal is on the right side of the USB interface of the terminal, if the terminal is identified as in the beside-head-and-hand-right phantom status, controlling the first adjustable device to be in the off state; and if the terminal is identified as in the beside-head-and-hand-left phantom status, controlling the first adjustable device to be in the on state; or when the feedpoint of the primary radio frequency channel of the terminal is on the left side of the USB interface of the terminal, if the terminal is identified as in the beside-head-and-hand-left status, controlling the first adjustable device to be in the off state; and if the terminal is identified as in the beside-head-and-hand-right phantom status, controlling the first adjustable device to be in the on state.

DESCRIPTION OF EMBODIMENTS

In a terminal configured with an antenna, a feedpoint of a primary radio frequency channel is usually on the right side of a universal serial bus (Universal Serial Bus, USB) interface of the terminal. Because a low-frequency current null of an antenna is located at an end of a low-frequency stud of the antenna, a low-frequency current null of the terminal antenna is on the left side of the antenna. When a user holds a terminal with the right hand during communication, the right hand is relatively close to a left side of an antenna. A hand phantom causes a low frequency to be relatively low and decreases antenna efficiency, degrading communication performance. When the user holds the terminal with the left hand during communication, the left hand is relatively far from the left side of the antenna, having relatively small impact on the communication performance. Therefore, low-frequency beside-head-and-hand-right performance is worse than low-frequency beside-head-and-hand-left performance, basically with a difference of 3 dB. If the terminal uses a slot antenna or an antenna with a metallic frame, the beside-head-and-hand-right performance is even worse, and even a death grip may occur. Based on this, embodiments of this application disclose an antenna to resolve a problem that imbalanced performance of the antenna in low-frequency beside-head-and-hand-left and beside-head-and-hand-right statuses affects communication quality of the terminal in a head and hand phantom status.

Figure 1A:
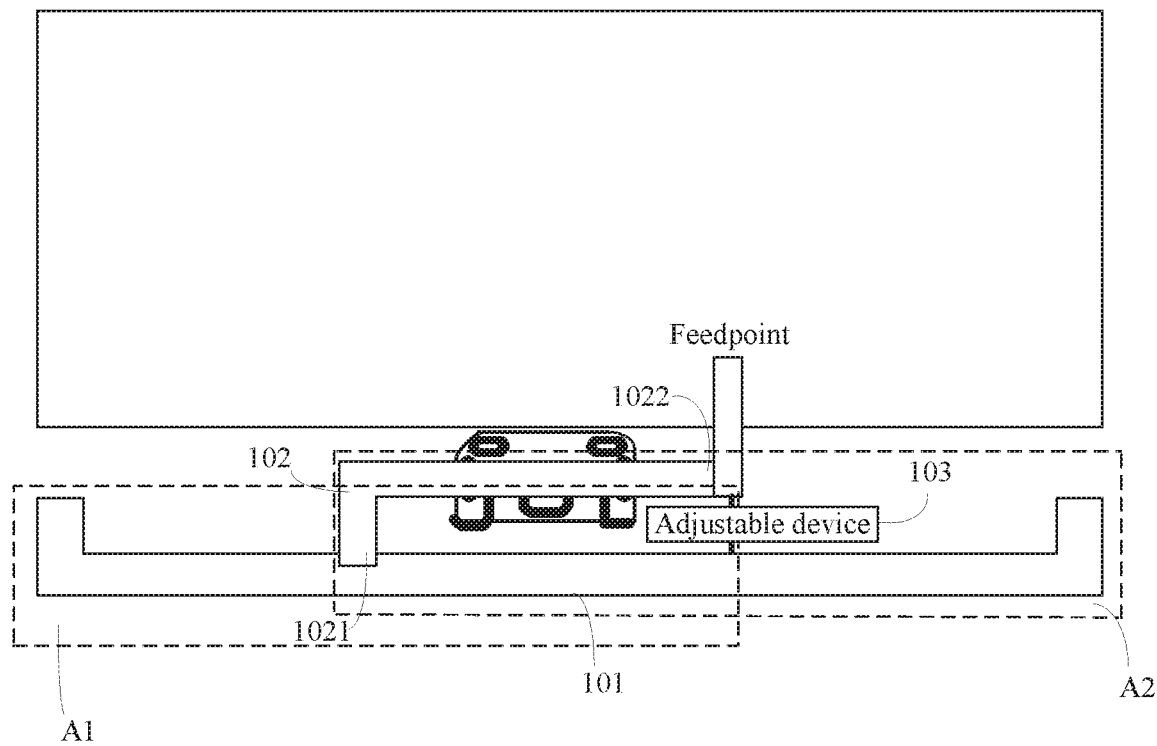
FIG. 1A is a schematic structural diagram of a T antenna according to an embodiment of this application.

As shown in FIG. 1A, a T antenna disclosed in an embodiment of this application includes an antenna body 101 and an antenna branch (antenna branch) 102. A first end 1021 of the antenna branch 102 is connected to the antenna body 101, a second end 1022 of the antenna branch 102 is connected to a feedpoint of a primary radio frequency channel, and the second end 1022 of the antenna branch 102 is further connected to the antenna body 101 through a first adjustable device 103.

It should be noted that an antenna wiring 102 is a conductor and serves radiation. As shown in FIG. 1A, the antenna wiring 102 may be arranged in an L shape, to connect to the antenna body 102 and the feedpoint of the primary radio frequency channel. Certainly, the antenna wiring 102 may be arranged in another shape, provided that one end of the antenna branch can be connected to the antenna body and the other end can be connected to the feedpoint of the primary radio frequency channel.

Figure 1B:
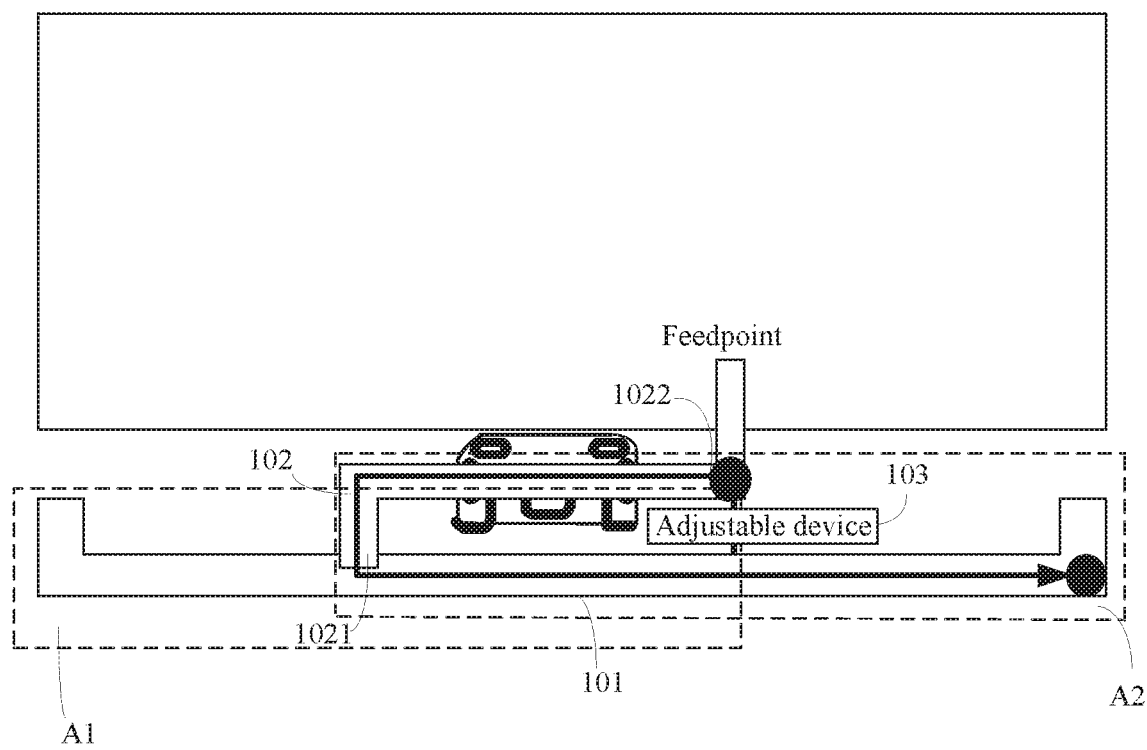
FIG. 1B is a schematic diagram of communication performance of a terminal antenna when a first adjustable device is switched off according to an embodiment of this application.
Figure 1C:
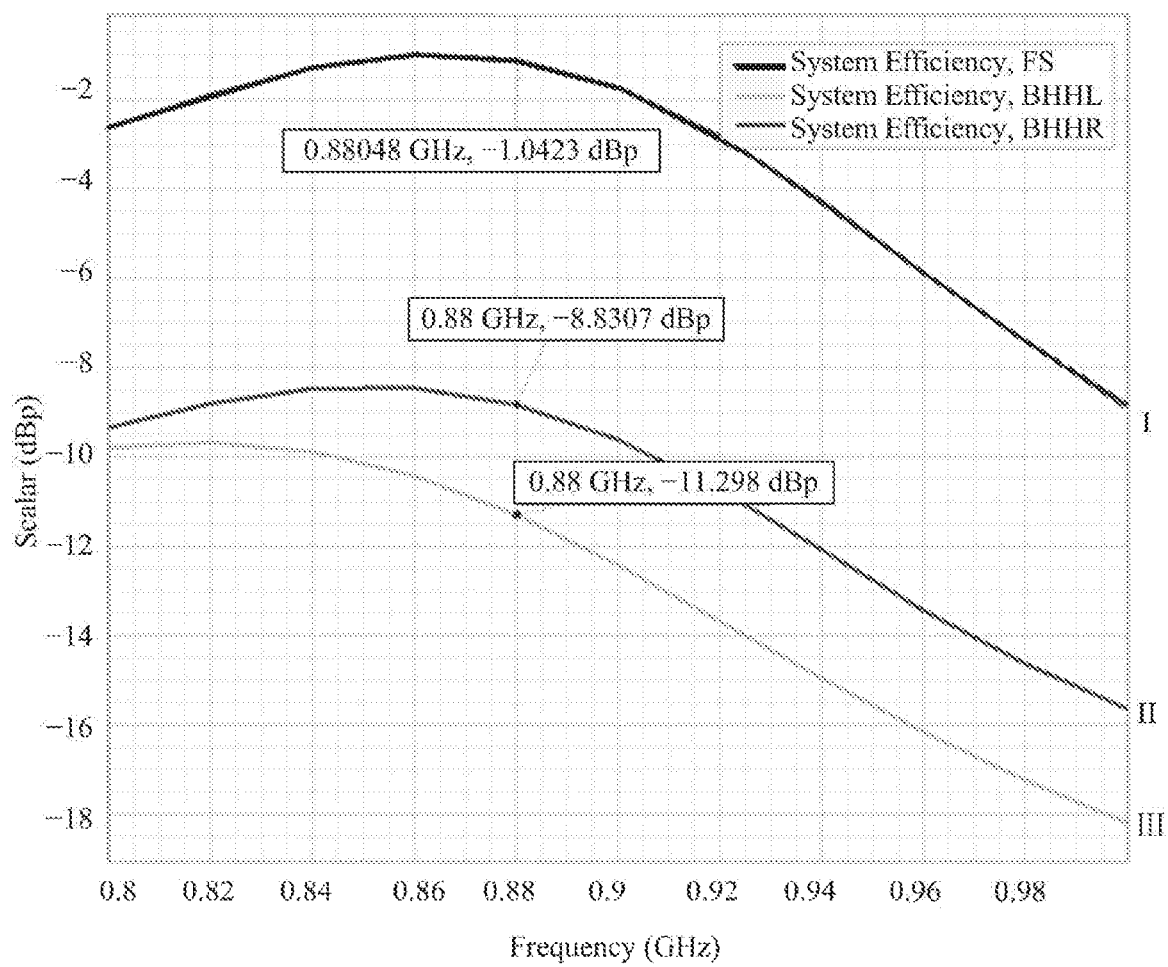
FIG. 1C is a schematic diagram of a current flow of a terminal antenna when a first adjustable device is switched off according to an embodiment of this application.

The first adjustable device 103 can be in an on state or an off state, and may be a switch device such as a single-pole four-throw switch, a four-pole four-throw switch, or a double-pole double-throw switch. When the first adjustable device 103 is switched off, the feedpoint of the primary radio frequency channel is connected to the antenna body 101 through the antenna branch 102. Therefore, a low-frequency stud of the antenna is on the right side of the antenna body 101, as shown in a dashed-line box A2 in FIG. 1A. A low-frequency current null of the antenna is also on the right side of the antenna body. In this case, beside-head-and-hand-right performance of the terminal is relatively good. When the first adjustable device 103 is switched off, a current flows from the feedpoint of the primary radio frequency channel to the right side of the antenna body 101 through the antenna branch, as shown by an arrow in FIG. 1B. FIG. 1C shows communication performance of the antenna when the terminal is in different modes. In FIG. 1C, a line I is used to reflect communication performance of the antenna when the terminal is in a free space communication status, a line II is used to reflect communication performance of the antenna when the terminal is in a beside-head-and-hand-right communication status, and a line III is used to reflect communication performance of the antenna when the terminal is in a beside-head-and-hand-left communication status. As can be seen from the line II and the line III in the figure, when the first adjustable device 103 is switched off, the beside-head-and-hand-right performance of the terminal is better.

Figure 1D:
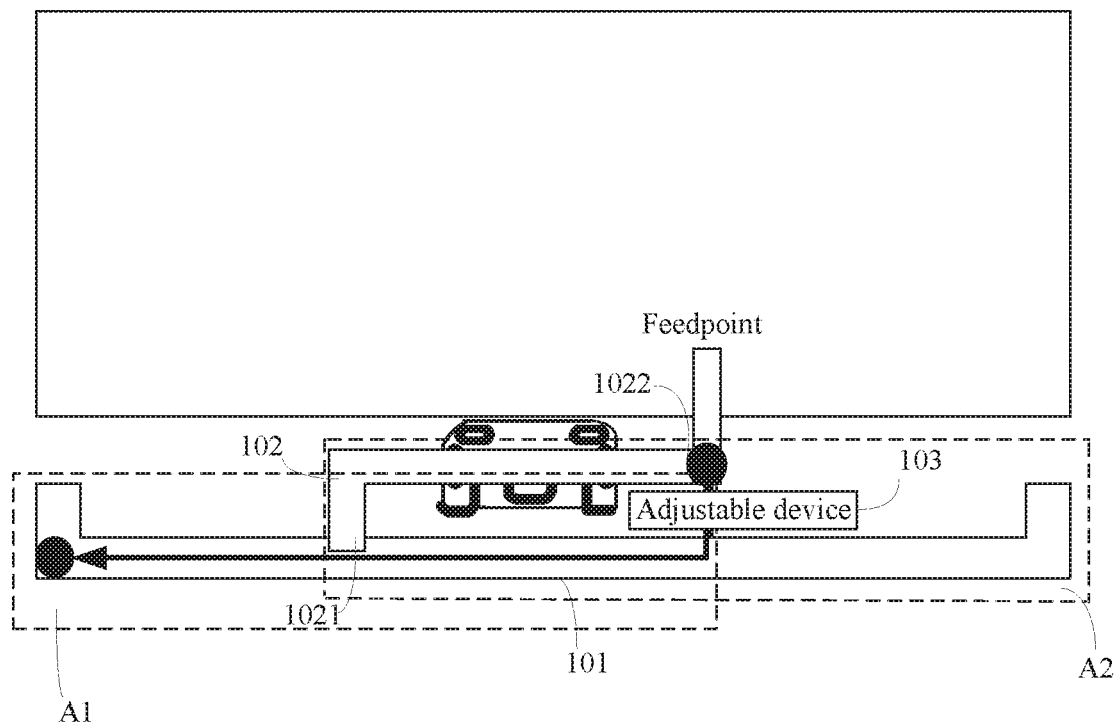
FIG. 1D is a schematic diagram of communication performance of a terminal antenna when a first adjustable device is switched on according to an embodiment of this application.
Figure 1E:
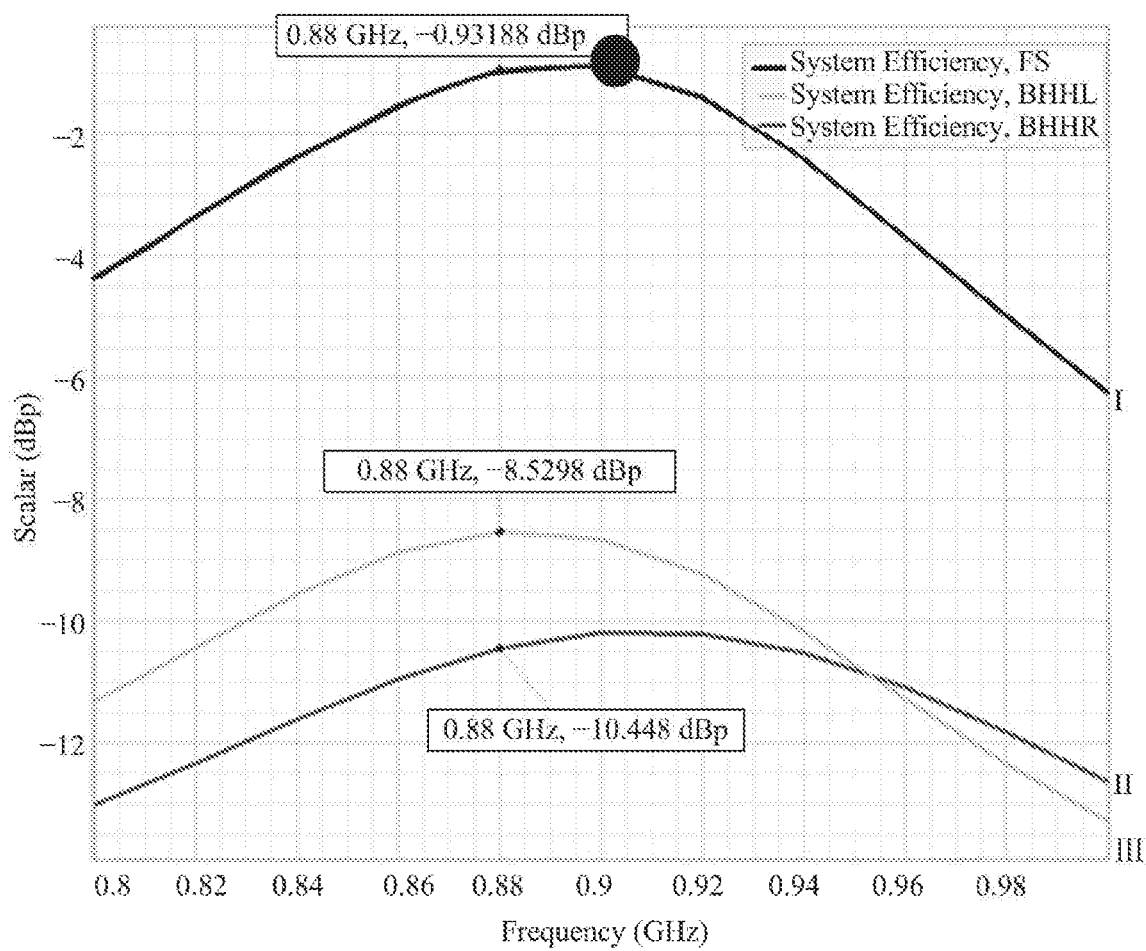
FIG. 1E is a schematic diagram of a current flow of a terminal antenna when a first adjustable device is switched on according to an embodiment of this application.

When the first adjustable device 103 is switched on, the feedpoint of the primary radio frequency channel is connected to the antenna body 101 through the first adjustable device 103. The low-frequency stud of the antenna is on the left side of the antenna body 101, as shown in a dashed-line box A1 in FIG. 1. The low-frequency current null of the antenna is also on the left side of the antenna body 101. Beside-head-and-hand-left performance of the terminal is relatively good. When the first adjustable device 103 is switched on, a current flows directly from the feedpoint of the primary radio frequency channel to the left side of the antenna body 101, as shown by an arrow in FIG. 1D. FIG. 1E shows communication performance of the antenna when the terminal is in different modes. In FIG. 1E, a line I is used to reflect communication performance of the antenna when the terminal is in a free space communication status, a line II is used to reflect communication performance of the antenna when the terminal is in a beside-head-and-hand-right communication status, and a line III is used to reflect communication performance of the antenna when the terminal is in a beside-head-and-hand-left communication status. As can be seen from the line 11 and the line III in the figure, when the first adjustable device 103 is switched off, the beside-head-and-hand-left performance of the terminal is better.

When the terminal is in the beside-head-and-hand-left status, the first adjustable device 103 is switched on, and the antenna branch 102 is not connected to the antenna body 101. This can ensure relatively good beside-head-and-hand-left performance. When the terminal is in the beside-head-and-hand-right status, the first adjustable device 103 is switched off, and the antenna branch 102 is connected to the antenna body 101. This can ensure relatively good beside-head-and-hand-right performance. Therefore, the antenna branch 102 can be connected to or disconnected from the antenna body 101 by changing a status of the first adjustable device 103, so as to implement switching of the low-frequency current null of the antenna and achieve relatively balanced low-frequency head and hand phantom performance. This improves communication quality of the terminal, and can resolve a problem of low-frequency death grip in most scenarios.

Figure 2:
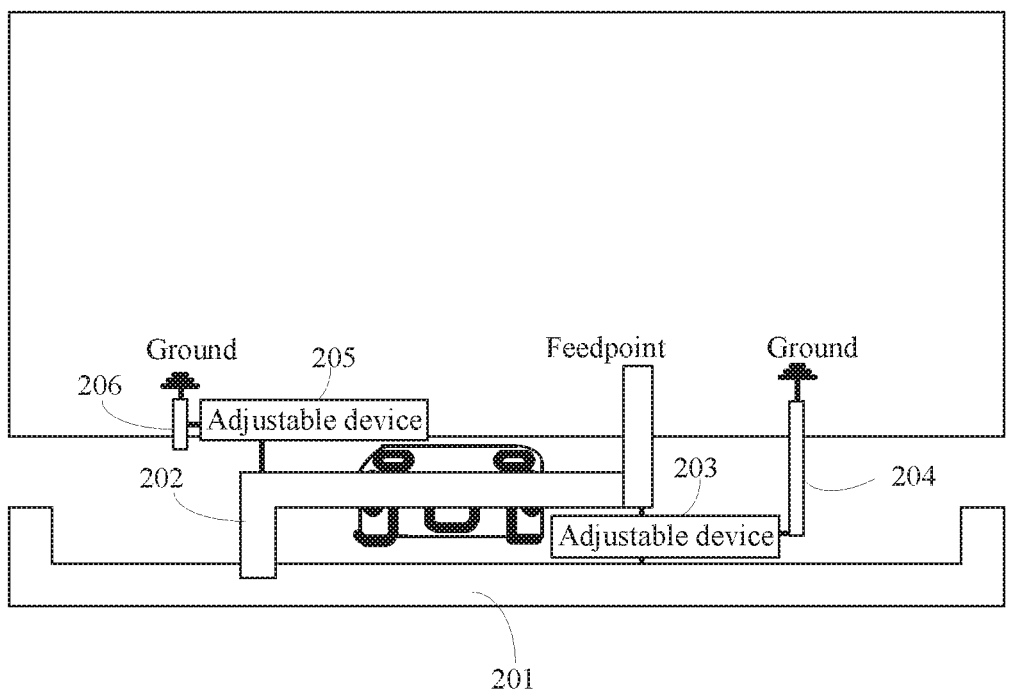
FIG. 2 is a schematic structural diagram of a T antenna according to another embodiment of this application.

Optionally, in another embodiment of this application, as shown in FIG. 2, a first adjustment device 203 may be further grounded by using a component 204. Grounding the first adjustable device 203 by using the component 204 can implement impedance for switching to a low frequency, to obtain good radiation performance. Optionally, the component 204 includes an inductor or a capacitor. When an adjustable device 203 is switched on, grounding the first adjustable device 203 by using a capacitor or an inductor is equivalent to connecting a primary radio frequency channel in low frequency in parallel to the capacitor or the inductor. In this was, low-frequency impedance of the antenna is close to 50 ohm, and a reflection coefficient is decreased, thereby improving the radiation performance.

Optionally, in another embodiment of this application, as shown in FIG. 2, an antenna branch 202 is further connected to a second adjustable device 205, and the second adjustable device 205 is grounded by using an inductor 206. The second adjustable device 205 and the inductor 206 can help adjust a low frequency resonance point. The second adjustable device 205 may be located at any position on the antenna branch 202. However, for a purpose of obtaining a relatively large scope for low-frequency frequency adjustment, the second adjustable device 205 is usually located at a region on the antenna branch 202 that is far from the feedpoint of the primary radio frequency channel, as shown in FIG. 2.

It should be noted that the second adjustable device 205 also includes two states: on and off. When the second adjustable device 205 is in the off state, an antenna is in lowest frequency. When the second adjustable device 205 is in the on state, the antenna is in highest frequency. In addition, the second adjustable device 205 can further adjust a frequency band of the antenna by changing an inductance value of the inductor 206 that is connected to the second adjustable device 205.

Specifically, when a first adjustable device 203 is switched off, the feedpoint of the primary radio frequency channel is connected to an antenna body 201 through the antenna branch 202. The low-frequency stud of the antenna is on the right side of the antenna body 201. To place the antenna in low frequency, the second adjustable device 205 needs to be switched on and connected to a first inductor with a relatively small inductance value. In addition, when the first adjustable device 203 is switched on, the feedpoint of the primary radio frequency channel is connected to the antenna body 201 through the first adjustable device 203. The low-frequency stud of the antenna is on the left side of the antenna body 201. Likewise, to place the antenna in low frequency in the same band as that when the first adjustable device 203 is switched off and the second adjustable device 105 is connected to the first inductor, the second adjustable device 205 needs to be switched on and connected to a second inductor whose inductance value is greater than that of the first inductor.

It should be noted that specific inductance values of the first inductor and the second inductor are subject to lengths of low-frequency studs of antennas. Therefore, they are not fixed values and can be set based on an actual length of a low-frequency stud of an antenna in a terminal. The length herein may be a physical length or an electrical length.

Figure 3:
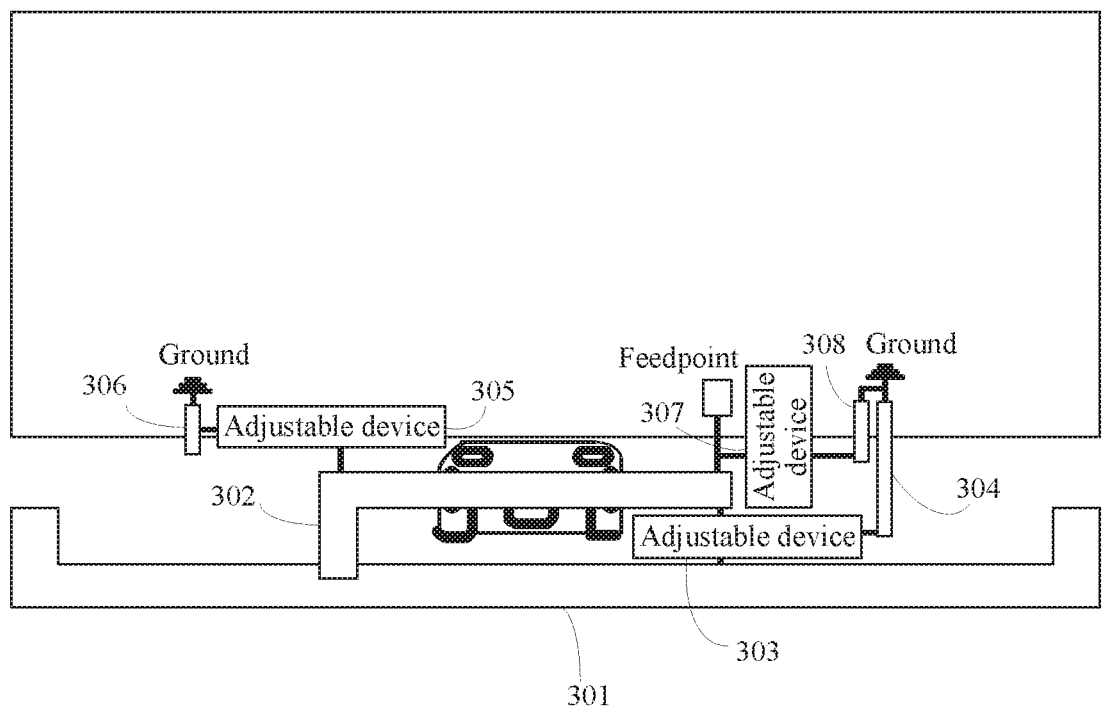
FIG. 3 is a schematic structural diagram of a T antenna according to another embodiment of this application.

Another embodiment of this application further discloses a T antenna. As shown in FIG. 3, the antenna includes an antenna body 301, an antenna branch 302, a first adjustable device 303, a component 304, a second adjustable device 305, and an inductor 306. In addition, for connection manners and working processes of the antenna body 301, the antenna branch 302, the first adjustable device 303, the component 304, the second adjustable device 305, and the inductor 306, refer to the foregoing embodiment. Details are not described herein.

In this embodiment, the antenna further includes a third adjustable device 307. One end of the third adjustable device 307 is connected to a feedpoint of a primary radio frequency channel, and the other end is grounded by using a component 308. Optionally, the component 308 includes an inductor or a capacitor.

When the third adjustable device 307 is switched on, it is equivalent to connecting the primary radio frequency channel in low frequency in parallel to the capacitor or the inductor. In this case, low-frequency impedance of the antenna may be further adjusted to be close to 50 ohm, thereby obtaining a better reflection coefficient and improving radiation performance.

Figure 4:
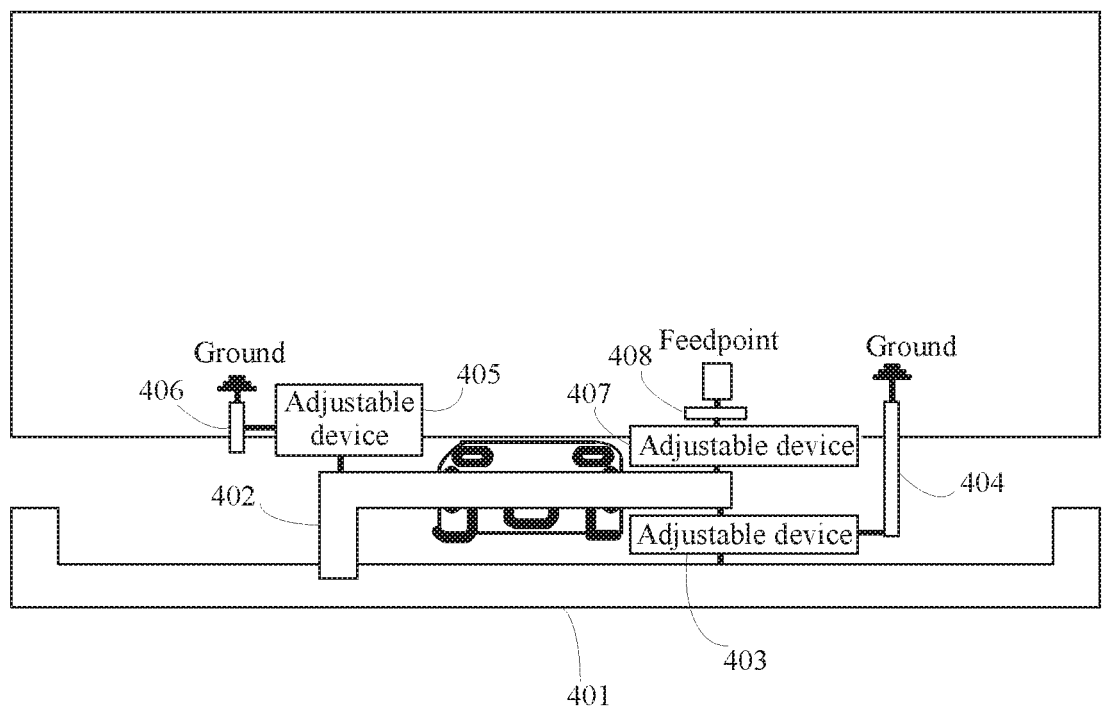
FIG. 4 is a schematic structural diagram of a T antenna according to another embodiment of this application.

It should be further noted that the third adjustable device may be alternatively connected to the antenna in another manner. As shown in FIG. 4, in another embodiment of this application, one end of a third adjustable device 407 is connected to a feedpoint of a primary radio frequency channel by using a component 408, and the other end is connected to an antenna branch 402.

For connection manners and working processes of an antenna body 401, the antenna branch 402, a first adjustable device 403, a component 404, a second adjustable device 405, and an inductor 406 in this embodiment, refer to the foregoing several embodiments. Details are not described herein. In addition, a function of the third adjustable device 407 may correspond to that described in the embodiment of FIG. 3. Details are not described herein.

Figures 5, 6:
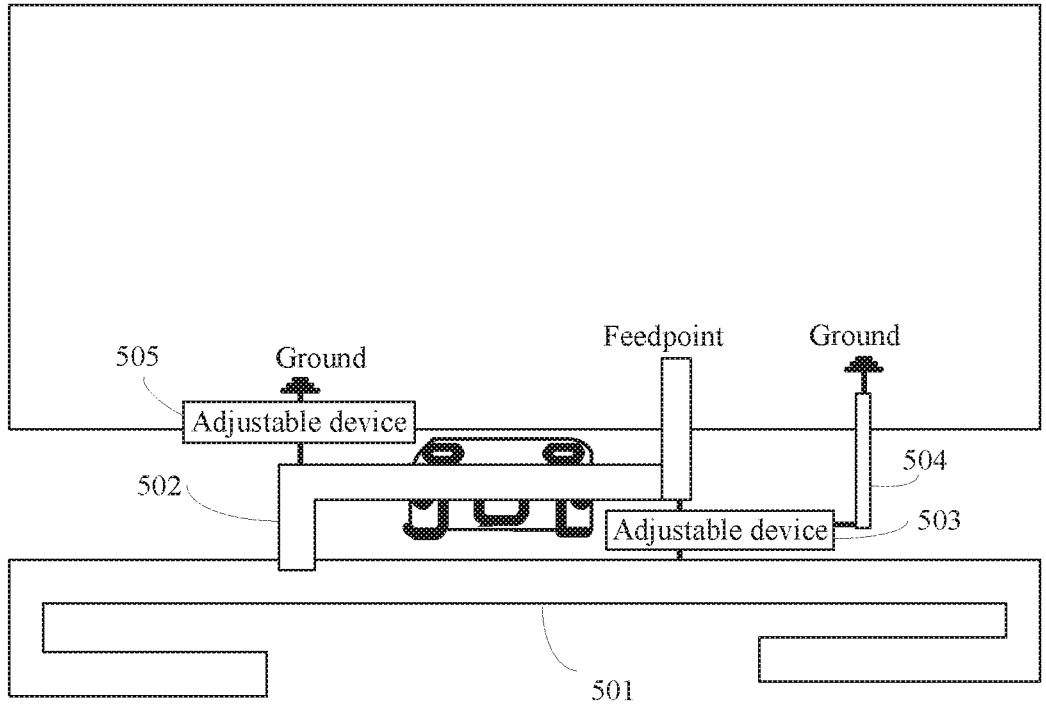
FIG. 5 is a schematic structural diagram of an IFA antenna according to an embodiment of this application.
FIG. 6 is a flowchart of an antenna control method according to an embodiment of this application.

An embodiment of this application further discloses an IFA antenna. As shown in FIG. 5, the antenna includes an antenna body 501 and an antenna branch 502.

A first end of the antenna branch 502 is connected to the antenna body 501, a second end of the antenna branch 502 is connected to a feedpoint of a primary radio frequency channel, and the second end of the antenna branch 502 is further connected to the antenna body 501 through a first adjustable device 503.

Optionally, the first adjustment device 503 is further grounded by using a component 504. The antenna branch 502 is further connected to a second adjustable device 505. In addition, the second adjustable device 505 is grounded by using an inductor (not shown in the figure).

In the IFA antenna disclosed in this embodiment, the antenna branch 502 is the same as the antenna branch 102 disclosed in the foregoing embodiment, the first adjustable device 503 is the same as the first adjustable device 103 disclosed in the foregoing embodiment, and the second adjustable device 505 is the same as the second adjustable device 105 disclosed in the foregoing embodiment. Details are not described herein. In addition, for working processes of various components of the IFA antenna in this embodiment, refer to the foregoing embodiments. Details are not described herein.

It should be further noted that, to further adjust low-frequency impedance of the antenna to be close to 50 ohm, the IFA antenna disclosed in this embodiment may further include a third adjustable device. For a connection manner of the third adjustable device, refer to the embodiments corresponding to FIG. 3 and FIG. 4. Details are not described herein.

It can be learned from the two embodiments corresponding to FIG. 1A and FIG. 5 that the feedpoint of the primary radio frequency channel is on the right side of a USB interface of the terminal, a low-frequency current null is disposed in the terminal antenna close to an edge of the terminal, and an antenna branch is connected between the feedpoint of the primary radio frequency channel and the antenna body. When the terminal is in a beside-head-and-hand-left status, the first adjustable device is switched on and the antenna branch is short-circuited to ensure relatively good beside-head-and-hand-left performance. When the terminal is in a beside-head-and-hand-right status, the first adjustable device is switched off, and the antenna branch is connected to the antenna body to ensure relatively good beside-head-and-hand-right performance.

Certainly, if the feedpoint of the primary radio frequency channel is on the left side of the USB interface of the terminal, an antenna branch may also be connected between the feedpoint of the primary radio frequency channel and the antenna body. The first adjustable device controls whether to connect the antenna branch. A difference lies in that, when the terminal is in the beside-head-and-hand-left status, the first adjustable device is switched off, and the antenna branch is connected to the antenna body to ensure relatively good beside-head-and-hand-left performance; when the terminal is in the beside-head-and-hand-right status, the first adjustable device is switched on, and the antenna branch is short-circuited to ensure relatively good beside-head-and-hand-right performance.

Another embodiment of this application further discloses an antenna control method. For an antenna structure, refer to the foregoing several embodiments. Details are not described herein. Referring to FIG. 6, the antenna control method disclosed in this embodiment includes the following steps.

S601: When a terminal is in a head and hand phantom communication status, identify a type of the head and hand phantom communication status of the terminal.

Types of the head and hand phantom communication status include beside-head-and-hand-left and beside-head-and-hand-right.

Optionally, in an implementation of step S601, the step includes the following sub-steps.

S6011: Obtain antenna performance parameter values of a first adjustable device in an on state and an off state.

Antenna performance parameters include a received signal strength of the antenna and impedance of a primary radio frequency channel.

When the terminal is in the head and hand phantom communication status, imbalanced antenna performance may be caused when the terminal is in different types of the head and hand phantom communication status, because a feedpoint of a primary radio frequency channel of the terminal is on the left or right side of a USB interface of the terminal. In this case, an antenna branch is connected between the antenna body and the feedpoint of the primary radio frequency channel of the terminal by using a first adjustable device, to adjust performance of the antenna in different types of the head and hand phantom communication status.

To ensure relatively good antenna performance when the terminal is in different types of the head and hand phantom communication status, an on/off state of the first adjustable device needs to be adjusted based on the type of the head and hand phantom communication status of the terminal. Specifically, the first adjustable device is switched on for a short period of time and then switched off for a short period of time to obtain antenna performance parameter values in the on state and the off state.

S6012: Identify the type of the head and hand phantom communication status of the terminal based on the antenna performance parameter value of the first adjustable device in the on state and the antenna performance parameter value of the first adjustable device in the off state.

A position of the feedpoint of the primary radio frequency channel of the terminal affects the antenna communication performance of the terminal in different types of the head and hand phantom communication status. Therefore, the position of the feedpoint of the primary radio frequency channel of the terminal needs to be determined. Specifically, the position of the feedpoint of the primary radio frequency channel may be specified before the first adjustable device is controlled to be switched on or off, or may be obtained through detection before the type of the head and hand phantom communication status of the terminal is identified.

It should be noted that when the feedpoint of the primary radio frequency channel of the terminal is on the right side of a USB interface of the terminal, if the antenna performance parameter value of the first adjustable device in the on state is greater than the antenna performance parameter value of the first adjustable device in the off state, the terminal is identified as in the beside-head-and-hand-left status; if the antenna performance parameter value of the first adjustable device in the on state is less than the antenna performance parameter value of the first adjustable device in the off state, the terminal is identified as in the beside-head-and-hand-right status.

When the feedpoint of the primary radio frequency channel of the terminal is on the left side of the USB interface of the terminal, if the antenna performance parameter value of the first adjustable device in the on state is greater than the antenna performance parameter value of the first adjustable device in the off state, the terminal is identified as in the beside-head-and-hand-right status; if the antenna performance parameter value of the first adjustable device in the on state is less than the antenna performance parameter value of the first adjustable device in the off state, the terminal is identified as in the beside-head-and-hand-left status.

Step S601 may be alternatively implemented in another manner, for example, detecting, by using a detection device, whether a user holds the terminal with the left hand or the right hand, or detecting a geographical location of the terminal to determine whether the terminal is on the left side or the right side of the user. Details are not described herein.

S602: Adjust an on/off state of the first adjustable device based on the type of the head and hand phantom communication status of the terminal.

The on/off state of the first adjustable device after the adjustment needs to ensure optimal antenna performance in the head and hand communication status of the terminal.

Optionally, with reference to the position of the feedpoint of the primary radio frequency channel of the terminal, an implementation of this step includes:

when the feedpoint of the primary radio frequency channel of the terminal is on the right side of the USB interface of the terminal, if the terminal is identified as in the beside-head-and-hand-right status, controlling the first adjustable device to be in the off state; and if the terminal is identified as in the beside-head-and-hand-left status, controlling the first adjustable device to be in the on state.

Another implementation of this step includes: when the feedpoint of the primary radio frequency channel of the terminal is on the left side of the USB interface of the terminal, if the terminal is identified as in the beside-head-and-hand-left status, controlling the first adjustable device to be in the off state; and if the terminal is identified as in the beside-head-and-hand-right status, controlling the first adjustable device to be in the on state.

For a specific implementation principle of the antenna control method disclosed in this embodiment of this application, refer to the foregoing antenna embodiments. Details are not described herein.

Optionally, in another embodiment of this application, if an antenna is further disposed with a second adjustable device, an antenna control method further needs to control an on/off status of the second adjustable device in addition to controlling on/off of a first adjustable device. Specifically, the antenna control method disclosed in this embodiment further includes:

when the first adjustable device is in an off state, controlling the second adjustable device to be in an on state and connected to a first inductor; or when the first adjustable device is in an on state, controlling the second adjustable device to be in the on state and connected to a second inductor, where an inductance value of the second inductor is greater than an inductance value of the first inductor.

For a principle of controlling the second adjustable device in this embodiment, refer to the embodiment corresponding to FIG. 2. Details are not described herein.

The low frequency described in the foregoing embodiments includes 700 MHz to 960 MHz.

The terms used in the embodiments of the present invention are merely for the purpose of illustrating specific embodiments, and are not intended to limit the present invention. The terms "a", "the" and "this" of singular forms used in the embodiments and the appended claims of the present invention are also intended to include plural forms, unless otherwise specified in the context clearly.

It should be noted that a frequency described in the embodiments of the present invention may be understood as a resonance frequency. A person of ordinary skill in the art may consider a frequency within a range of 7% to 13% of a resonance frequency as an operating bandwidth of an antenna. For example, when a resonance frequency of an antenna is 1800 MHz and an operating bandwidth is 10% of the resonance frequency, the antenna operates in a range from 1620 MHz to 1980 MHz.

It should be further understood that in the embodiments of the present invention, unless otherwise specified, the expression "greater than" should be understood as including "greater than and equal to", the expression "less than" should be understood as including "less than and equal to", and the expressions "above". "below", and "between" should all be understood as an inclusive relationship.

It should be noted that in the embodiments of the present invention, the term "ground" may be replaced with other terms such as "antenna grounding part", "antenna ground", and "ground plane". They are all used to represent basically the same meaning. The antenna grounding part is connected to a ground cable of a radio frequency transceiver circuit.

Optionally, the "ground" may be disposed mainly on a surface of a printed circuit board of a communications device. An electrical connection component such as a spring, a screw, a spring plate, a conductive fabric, a conductive foam, or a conductive adhesive is also disposed on the printed circuit board and used to establish a connection between a radio frequency circuit and the antenna, or establish a connection between the antenna grounding part and the antenna. In addition, a clearance between the antenna and the antenna grounding part may be filled with air, plastic, ceramic, or another dielectric material.

It should be noted that A being "connected" to B as described in the embodiments of the present invention indicates a physical association between an electrical signal passing through A and an electrical signal passing through B, including a direct connection between A and B by using a wire, a spring, or the like, or an indirect connection between A and B through another component C, and an electromagnetic induction-triggered association between the electrical signal passing through A and the electrical signal passing through B.

It should be noted that the capacitor and the inductor in the foregoing embodiments may be a lumped capacitor and a lumped inductor, a capacitor and an inductor, or a distributed capacitor and a distributed inductor. This is not limited in the embodiments of the present invention.

It should be noted that in the embodiments of the present invention, ordinal numbers such as "first", "second", and "third" are used only for differentiation, unless otherwise specified in the context.

In the foregoing embodiments, the description of each embodiment has respective focuses. For a part that is not described in detail in an embodiment, refer to related descriptions in other embodiments.

What is claimed is:

1. An antenna comprising:
a first adjustable device configured for an on state and an off state;
an antenna body; and
an antenna branch comprising:
a first end coupled to the antenna body; and
a second end configured to couple to a feedpoint of a primary radio frequency channel and coupled to the antenna body through the first adjustable device, wherein the antenna branch is a conductive component that connects the antenna body at the first end to the feedpoint at the second end.

2. The antenna of claim 1, wherein the first adjustable device is grounded using a component.

3. The antenna of claim 1, wherein the antenna branch is grounded using a second adjustable device, and wherein the second adjustable device is configured to:
   switch on and couple to a first inductor when the first adjustable device is in the off state; and
   switch on and couple to a second inductor when the first adjustable device is in the on state, wherein a second inductance value of the second inductor is greater than a first inductance value of the first inductor.

4. The antenna of claim 3, wherein the second adjustable device is located at a region on the antenna branch that is away from the feedpoint.

5. The antenna of claim 1, further comprising a third adjustable device, wherein the third adjustable device comprises:
   a third end coupled to the feedpoint; and
   a fourth end grounded using a component.

6. The antenna of claim 1, further comprising a fourth adjustable device, wherein the fourth adjustable device comprises:
   a fifth end coupled to the feedpoint; and
   a sixth end coupled to the antenna branch.

7. A terminal comprising:
   an antenna comprising:
      a first adjustable device configured for an on state and an off state;
      an antenna body; and
      an antenna branch comprising:
         a first end coupled to the antenna body; and
         a second end configured to couple to a feedpoint of a primary radio frequency channel and coupled to the antenna body through the first adjustable device, wherein the antenna branch is a conductive component that connects the antenna body at the first end to the feedpoint at the second end.

8. The terminal of claim 7, wherein the first adjustable device is grounded using a component.

9. The terminal of claim 7, wherein the antenna branch is grounded using a second adjustable device, and wherein the second adjustable device is configured to:
   switch on and couple to a first inductor when the first adjustable device is in the off state; and
   switch on and couple to a second inductor when the first adjustable device is in the on state, wherein a second inductance value of the second inductor is greater than a first inductance value of the first inductor.

10. The terminal of claim 9, wherein the second adjustable device is located at a region on the antenna branch that is away from the feedpoint.

11. The terminal of claim 7, further comprising a third adjustable device, wherein the third adjustable device comprises:
    a third end coupled to the feedpoint; and
    a fourth end grounded using a component.

12. The terminal of claim 7, further comprising a fourth adjustable device, wherein the fourth adjustable device comprises:
    a fifth end coupled to the feedpoint; and
    a sixth end coupled to the antenna branch.

13. The terminal of claim 7, wherein the terminal is configured to:
    identify that the terminal is in a beside-head-and-hand-left communication status;
    select, in response to identifying that the terminal is in the beside-head-and-hand-left communication status, an on/off state of the first adjustable device;
    identify that the terminal is in a beside-head-and-hand-right communication status; and
    select, in response to identifying that the terminal is in the beside-head-and-hand-right communication status, an adverse on/off state of the first adjustable device corresponding to the beside-head-and-hand-left communication status.

14. The terminal of claim 13, further comprising a Universal Serial Bus (USB) interface, wherein the terminal is further configured to:
    identify that the feedpoint is on a right side of the USB interface; and
    identify, in response to identifying that the feedpoint is on the right side of the USB interface, that the terminal is in the beside-head-and-hand-left status when an antenna performance parameter value of the first adjustable device in the on state is greater than the antenna performance parameter value of the first adjustable device in the off state.

15. The terminal of claim 13, further comprising a Universal Serial Bus (USB) interface, wherein the terminal is further configured to:
    identify that the feedpoint is on a right side of the USB interface; and
    identify, in response to identifying that the feedpoint is on the right side of the USB interface, that the terminal is in the beside-head-and-hand-right status when an antenna performance parameter value of the first adjustable device in the on state is less than the antenna performance parameter value of the first adjustable device in the off state.

16. The terminal of claim 13, further comprising a Universal Serial Bus (USB) interface, wherein the terminal is further configured to:
    identify that the feedpoint is on a left side of the USB interface; and
    identify, in response to identifying that the feedpoint is on the left side of the USB interface, that the terminal is in the beside-head-and-hand-right status when an antenna performance parameter value of the first adjustable device in the on state is greater than the antenna performance parameter value of the first adjustable device in the off state.

17. The terminal of claim 13, further comprising a Universal Serial Bus (USB) interface, wherein the terminal is further configured to:
    identify that the feedpoint is on a left side of the USB interface; and
    identify, in response to identifying that the feedpoint is on the left side of the USB interface, that the terminal is in the beside-head-and-hand-left status when an antenna performance parameter value of the first adjustable device in the on state is less than the antenna performance parameter value of the first adjustable device in the off state.

18. The terminal of claim 13, wherein the terminal is further configured to:
    identify that the terminal is in the beside-head-and-hand-left communication status; and
    select, in response to identifying that the terminal is in the beside-head-and-hand-left communication status, the on state of the first adjustable device.

19. The terminal of claim 13, wherein the terminal is further configured to:

identify that the terminal is in the beside-head-and-hand-right communication status; and select, in response to identifying that the terminal is in the beside-head-and-hand-right communication status, the off state of the first adjustable device.

20. The terminal of claim 13, wherein the terminal is further configured to:

identify that the terminal is in the beside-head-and-hand-left communication status;

select, in response to identifying that the terminal is in the beside-head-and-hand-left communication status, the off state of the first adjustable device;

identify that the terminal is in the beside-head-and-hand-right communication status; and select, in response to identifying that the terminal is in the beside-head-and-hand-right communication status, the on state of the first adjustable device.

* * * * *